UNITED STATES PATENT OFFICE.

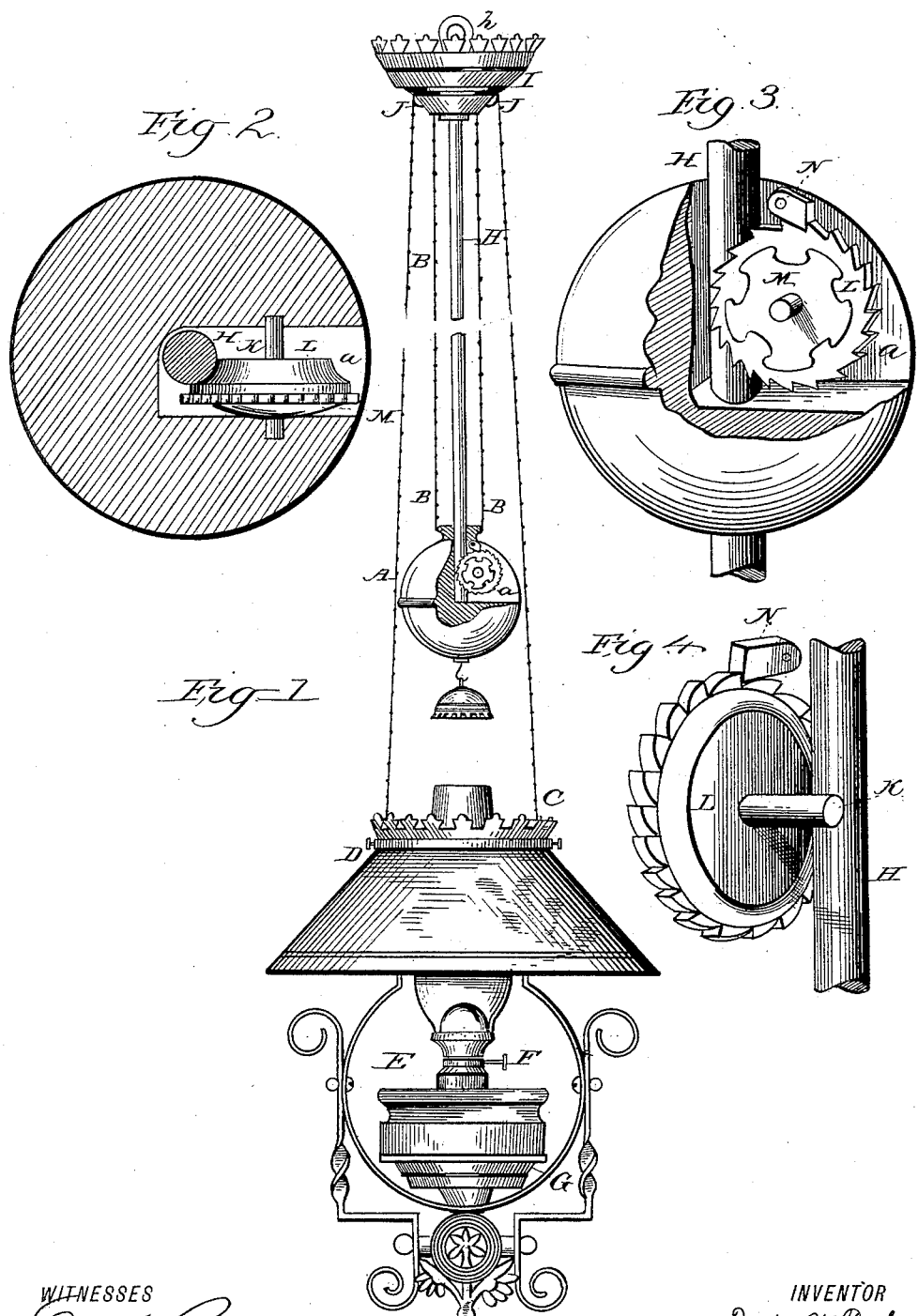

DEXTER W. PARKER, OF MERIDEN, CONNECTICUT, ASSIGNOR TO THE CHARLES PARKER COMPANY, OF SAME PLACE.

EXTENSION LAMP-FIXTURE.

SPECIFICATION forming part of Letters Patent No. 339,205, dated April 6, 1886.

Application filed March 2, 1885. Serial No. 157,518. (No model.)

*To all whom it may concern:*

Be it known that I, DEXTER W. PARKER, a citizen of the United States, residing at Meriden, county of New Haven, State of Connecticut, have invented new and useful Improvements in Extension Lamp-Fixtures, of which the following is a specification.

This invention relates to extension lamp-fixtures in which a counterbalance-weight is employed, and more particularly to such extension lamp-fixtures as are provided with a friction device, in addition to the weight, to allow for variation in the gravity of the lamp, shade, and other parts counterbalanced by said weight. In an application now pending, No. 144,308, filed September 30, 1884, I have shown, described, and claimed a friction device of this sort attached to the shaft of each roller over which a suspension-chain passes, the said device consisting of a friction-plate having ratchet-teeth, and a pawl which engages with these teeth, the effect being that no friction is applied when the lamp rises; but when the lamp begins to descend, said plate, being held stationary, applies friction to the roller, and thus aids the counterbalance-weight in preventing the accidental descent of the lamp. The counterbalance-weight, thus re-enforced, may be used with heavier lamps and shades than such as it would otherwise be adapted to. In the present improvement the friction device is located in the weight itself. This has the advantage of affording a more effectual protection for it, and of enabling a single friction device to be used, instead of two or three.

Further features of novelty will be hereinafter pointed out and claimed.

In the accompanying drawings, Figure 1 represents an elevation of a lamp-fixture embodying my invention. Fig. 2 represents an enlarged horizontal section of the weight and guide-rod, taken just above the friction device. Fig. 3 represents a perspective view of the weight and guide-rod, the weight being partly broken away to show the friction device; and Fig. 4 represents in detail a perspective view, on a larger scale, of the friction device and a part of the guide-rod, the view being taken from the other side.

In said drawings, A designates a globular counterbalance-weight, which is attached to the inner ends of the suspension-chains B, the outer ends of said chains being attached to the crown-ring C of a lamp-shade, D. The harp E, lamp F, and base-ring G are all suspended from this crown-ring, and said weight counterbalances them, moving up and down on a guide-rod, H, which extends downward from the eye $h$, whereby the fixture is suspended from a hook in the ceiling. The canopy I is provided, as usual, with rollers J, over which the chains B pass. The weight A is recessed at $a$, as shown in Figs. 2 and 3, to leave space for the friction device L, which is mounted on a short shaft, K, that has its bearings in the material of said weight at each side of the recess $a$. On this shaft, in addition to the friction disk or plate L, is a spring, M, which forces said disk against the guide-rod H. The periphery of said friction-disk is provided with ratchet-teeth, which face backward—that is, in a direction opposed to the rotation of the disk as the weight descends, and arranged to be engaged, when the weight begins to rise, by a pawl, N, pivoted to said weight. When the weight descends and the lamp rises, this pawl rides over said ratchet-teeth without engaging them, and the disk or plate L turns, by reason of its contact with guide-rod H, without any appreciable resistance. When the lamp begins to descend, the rod H causes the disk or friction device L to begin to turn in the direction which brings it into engagement with pawl N, which holds it stationary. The contact of this stationary disk with said rod affords sufficient friction to prevent the lamp from descending accidentally, even if its gravity considerably exceeds that of the counterbalance-weight. Nevertheless, it will yield readily to a pull by hand, so that the lamp may be conveniently adjusted to any desired position. The friction-disk, spring, and pawl are all contained within the weight, and thereby protected both from sight and from injury. The ratchet teeth or pawl cannot catch on any article of clothing or other exterior substance while the lamp is being packed or removed or hung. A single friction device answers every purpose; and when the weight is removed the friction device is removed also.

The construction, as will be seen, is exceedingly neat and simple, the external appearance not differing from that of a lamp provided with a counterbalance-weight only, although the presence of the friction device allows the same fixture to be used with a wide range of lamps, shades, and attachments, differing considerably in weight.

I am aware that it is not new to provide a globular counterbalance-weight with a frictional device for gripping the rod on which said weight slides. This, therefore, I do not broadly claim; but, so far as I am informed, such devices, when attached to weights, have always heretofore exerted a certain amount of friction when the lamp ascended, the action of the frictional device under such circumstances differing only in degree from its action when the lamp descended.

I do not claim in this application the combination of friction devices such as described, with rollers or pulleys over which the suspension-chains pass and the other operative parts of an extension-fixture, nor the combination of such friction devices with a spring-drum, which serves as a counter-balance, and to which they are applied, and the other operative parts of an extension-fixture, these constructions and combinations being shown and claimed in my applications No. 144,308, September 30, 1884, and No. 154,240, January 28, 1885, respectively; but

I claim—

1. In combination with a rod and a counterbalance-weight sliding thereon, a rotary friction device carried by said weight and in contact with said rod, an extension-lamp and chains counterbalanced by said weight, supports for said lamp and chains, and a detent engaging the friction device, substantially as set forth.

2. In combination with a rod, H, and a counterbalance-weight, A, sliding thereon, a friction-plate journaled in said weight and in contact with said rod, an extension-lamp and chains counterbalanced by said weight, a detent engaging said friction-plate, and supports for the lamp and chains, substantially as set forth.

3. In combination with a rod, lamp-chains, and counterbalance-weight, a friction-disk attached to said weight provided with peripheral ratchet-teeth, and a pawl which engages with said teeth and holds said disk stationary when the lamp descends, said disk being in contact with said rod and acting as a friction device, substantially as set forth.

4. In an extension lamp-fixture, in combination with a rod and a counterbalance-weight sliding thereon, a disk or plate journaled in said weight and in contact with said rod, a spring which holds said disk thus in contact, a clutch which engages with said disk and prevents said disk from turning when the weight ascends, and the lamp, lamp-harp, and suspending-chains counterbalanced by said weight, substantially as and for the purpose set forth.

5. As an article of manufacture, a globular weight having within it a disk, and a spring bearing against the latter, substantially as set forth.

6. In an extension-fixture for a lamp or chandelier, the combination of a rod and a counterbalance-weight sliding thereon with a friction plate or disk journaled in said weight and recessed to fit said rod, a ratchet having backwardly-facing teeth carried by said disk, a pawl attached to said weight and arranged to engage said ratchet, and a spring which is in contact with said disk, for the purpose set forth.

7. As an article of manufacture, a globular weight having within it a ratchet-toothed disk, a spring, and a pawl, arranged substantially as set forth.

In testimony whereof I have hereunto set my hand in the presence of two subscribing witnesses.

DEXTER W. PARKER.

Witnesses:
 FREDK. PEASE,
 RALPH A. PALMER.